(12) United States Patent
Zou et al.

(10) Patent No.: US 11,092,312 B2
(45) Date of Patent: Aug. 17, 2021

(54) LIGHT SOURCE DEVICE AND STAGE LAMP ILLUMINATION SYSTEM USING THE SAME

(71) Applicant: YLX INCORPORATED, Shenzhen (CN)

(72) Inventors: Siyuan Zou, Shenzhen (CN); Quan Zhang, Shenzhen (CN); Yi Li, Shenzhen (CN)

(73) Assignee: YLX Incorporated, Shenzhen (CN)

( * ) Notice: Subject to any disclaimer, the term of this patent is extended or adjusted under 35 U.S.C. 154(b) by 0 days.

(21) Appl. No.: 16/633,927

(22) PCT Filed: Jan. 31, 2018

(86) PCT No.: PCT/CN2018/074756
§ 371 (c)(1),
(2) Date: Jan. 24, 2020

(87) PCT Pub. No.: WO2019/019592
PCT Pub. Date: Jan. 31, 2019

(65) Prior Publication Data
US 2021/0148546 A1 May 20, 2021

(30) Foreign Application Priority Data
Jul. 25, 2017 (CN) .......................... 201720911369.7

(51) Int. Cl.
*F21V 9/08* (2018.01)
*F21V 13/14* (2006.01)
*F21Y 115/10* (2016.01)

(52) U.S. Cl.
CPC ................ *F21V 9/08* (2013.01); *F21V 13/14* (2013.01); *F21Y 2115/10* (2016.08)

(58) Field of Classification Search
CPC ........................... F21V 13/14; G02B 27/1006
See application file for complete search history.

(56) References Cited

U.S. PATENT DOCUMENTS 8,403,496 B2 * 3/2013 Qu .................... G02B 13/16
353/39
10,599,024 B2 * 3/2020 Inoko .................. G03B 21/28
(Continued)

FOREIGN PATENT DOCUMENTS

| CN | 101936459 | 1/2011 |
| CN | 101988630 | 3/2011 |

(Continued)

OTHER PUBLICATIONS

International Search Report for International Application PCT/CN2018/074756, dated Apr. 27, 2018.

*Primary Examiner* — Jong-Suk (James) Lee
*Assistant Examiner* — Eric T Eide
(74) *Attorney, Agent, or Firm* — Burris Law, PLLC

(57) ABSTRACT

A light source device incudes a first light source module configured to emit first light having a wavelength in a first spectral range, a second light source module configured to emit polychromatic light comprising second light having a wavelength in a second spectral range and third light having a wavelength in a third spectral range, a third light source module configured to emit fourth light in the second spectral range, a first filter configured to transmit the first light and the third light, reflect the second light, and reflect the fourth light to a light exit to be outputted, and a second filter configured to transmit the third light and the fourth light, and reflect the first light to the light exit to be outputted. The first light source module is provided with a first isolation device for preventing the second light from entering the first light source module.

20 Claims, 2 Drawing Sheets

(56) References Cited

U.S. PATENT DOCUMENTS

| | | | | |
|---|---|---|---|---|
| 2006/0132725 A1* | 6/2006 | Terada | ............... | G02B 27/1046 |
| | | | | 353/102 |
| 2007/0268692 A1 | 11/2007 | Chen et al. | | |
| 2009/0262308 A1* | 10/2009 | Ogawa | ................... | G03B 33/12 |
| | | | | 353/31 |
| 2013/0265552 A1* | 10/2013 | Yoo | ...................... | H04N 9/3197 |
| | | | | 353/31 |

FOREIGN PATENT DOCUMENTS

| | | |
|---|---|---|
| CN | 202330989 | 7/2012 |
| CN | 205301793 | 6/2016 |
| CN | 106249340 | 12/2016 |
| CN | 206311878 | 7/2017 |

\* cited by examiner

LIGHT SOURCE DEVICE AND STAGE LAMP ILLUMINATION SYSTEM USING THE SAME

CROSS-REFERENCE TO RELATED APPLICATIONS

This application is a U.S. national phase application of International Application No. PCT/CN2018/074756, filed on Jan. 31, 2018, which claims priority to and the benefit of Chinese Patent Application No. 201720911369.7, filed on Jul. 25, 2017. The disclosures of the above applications are incorporated herein by reference.

FIELD

The present disclosure relates to the field of illumination, and in particular, to a light source device and a stage lamp illumination system using the light source device.

BACKGROUND

At present, a projection lighting apparatus on the market generally uses an ultra-high pressure mercury lamp as a main light source, which has a short life, is expensive to replace later, and brings serious environmental pollution, while some projection lighting apparatuses in the related art use pure LED light sources, a disadvantage of which is that a luminous efficiency per unit area is insufficient, making it difficult to meet requirements of projectors or lighting devices on brightness and color quality.

Pure laser projector products currently on the market use a single blue laser light source, and both blue and green are from the same blue laser, resulting in that a color gamut coverage of a projected image is too small to achieve high-quality color reproduction, and because a divergence angle of the laser light source is very small, it is difficult to form a uniform projection image, and flares are prone to appear in the image. Some high-power polychromatic LED lighting sources use R+G+B three-color LED light source modules, but the luminous flux of the polychromatic LED is not high. Therefore, in order to enhance the luminous flux, white light with high light intensity is used, and light of a desired wavelength is obtained by a filter. Usually, a filter is used to obtain green light. However, when the filter transmits the green light, it will reflect part of light having other wavelengths, and returning of the reflected light to the light source will cause the light source to attenuate seriously, especially when blue light is reflected to a red light source, the red light source will be caused to attenuate seriously, and after the light source has been lighting for several tens of hours, the light attenuation reaches about 15%, such that normal lighting requirements on light attenuation cannot be satisfied, and stability of the light source is affected.

SUMMARY

The present disclosure provides a light source device and a stage lamp illumination system using the light source device with a stable light source and low light attenuation.

The light source device includes: a first light source module configured to emit first light having a wavelength in a first spectral range; a second light source module configured to emit polychromatic light, the polychromatic light comprising second light having a wavelength in a second spectral range and third light having a wavelength in a third spectral range; a third light source module configured to emit fourth light having a wavelength in the second spectral range; a first filter configured to transmit the first light and the third light, reflect the second light, and reflect the fourth light to a light exit of the light source device to be outputted; and a second filter configured to transmit the third light and the fourth light, and reflect the first light to the light exit of the light source device to be outputted, wherein the first light source module is provided with a first isolation device, and the first isolation device is configured to inhibit or prevent the second light from entering the first light source module.

The light source device of the present disclosure uses the first light source module, the second light source module, and the third light source module in cooperation with the first filter and the second filter to obtain light output having high light flux. In addition, the second light of the second light source module, which is obtained by reflection after passing through the first filter, may be reflected to the first light source module, causing attenuation of the first light. Therefore, the first isolation device is provided to inhibit or prevent the second light from entering the first light source module, so as to reduce or eliminate the influence of the reflected second light on the first light source module and reduce or avoid serious light attenuation (e.g., about 15% light attenuation or more) of the first light source module caused by the reflection of the second light, thereby obtaining a stable light source.

In one form of the present disclosure, the polychromatic light further comprises fifth light having a wavelength in the first spectral range, the second filter is further configured to reflect the fifth light in the polychromatic light to the third light source module, the third light source module is provided with a second isolation device, and the second isolation device is configured to inhibit or prevent the fifth light from entering the third light source module.

In at least one variation, the second light source module comprises a plurality of blue LED light sources, the second light source module is further provided with a light-absorbing material which absorbs the second light and/or the fifth light, and the light-absorbing material is disposed between the plurality of blue LED light sources.

In some variations, the first light source module comprises a plurality of red LED light sources, the third light source module comprises a plurality of blue LED light sources, the second light source module comprises a plurality of blue LED light sources and a wavelength conversion device, light in the first spectral range is red light, light in the second spectral range is blue light, light in the third spectral range is green light, the first filter is a blue light filter, and the second filter is a red light filter.

In at least one variation, the first isolation device is a device which is configured to reflect the second light, and the second isolation device is a device which is configured to reflect the fifth light.

In some variations, the first light source module further comprises a plurality of first lenses corresponding to the plurality of red LED light sources, and the first isolation device is a blue light reflective material provided on the plurality of first lenses; the third light source module further comprises a plurality of third lenses corresponding to the plurality of blue LED light sources, and the second isolation device is a red light reflective material provided on the plurality of third lenses.

In at least one variation, the second light source module faces the light exit of the light source device, and the first light source module and the third light source module are oppositely disposed on two sides of the second light source module.

In some variations, the first filter and the second filter are arranged to cross among the first light source module, the second light source module, and the third light source module.

In at least one variation, the light source device further comprises a condensing lens group, and the condensing lens group is disposed between the second light source module and the light exit of the light source device and faces the second light source module.

The present disclosure further provides a stage lamp illumination system, and the stage lamp illumination system adopts the light source device described above.

Different from the case in the related art, the light source device of the present disclosure uses the first light source module, the second light source module, and the third light source module in cooperation with the first filter and the second filter to obtain output light having high color quality and high light flux, and provision of the first isolation device reduces or eliminates influence of the second light of the second light source module, which is obtained by reflection after passing through the first filter, on the first light source module, so as to reduce or avoid serious light attenuation of the first light source module caused by the reflection of the second light, thereby obtaining a stable light source. Further, the present disclosure also provides a second isolation device to reduce or eliminate influence of the fifth light of the second light source module, which is obtained by reflection after passing through the second filter, on the third light source module, to reduce or avoid serious light attenuation of the third light source module caused by the reflection of the fifth light, which increases the light flux of a high-power polychromatic combined light source while reducing or preventing serious light attenuation caused by irradiating of reflected light on the light source module, thereby obtaining a stable light source. The output light of the stage lamp illumination system of the present disclosure has high color quality, stable light output, and high light flux.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

In order to enable those skilled in the art to better understand the technical solutions of the present disclosure, the present disclosure will be described in further detail below with reference to the drawings and specific forms of the present disclosure.

Figure 1:
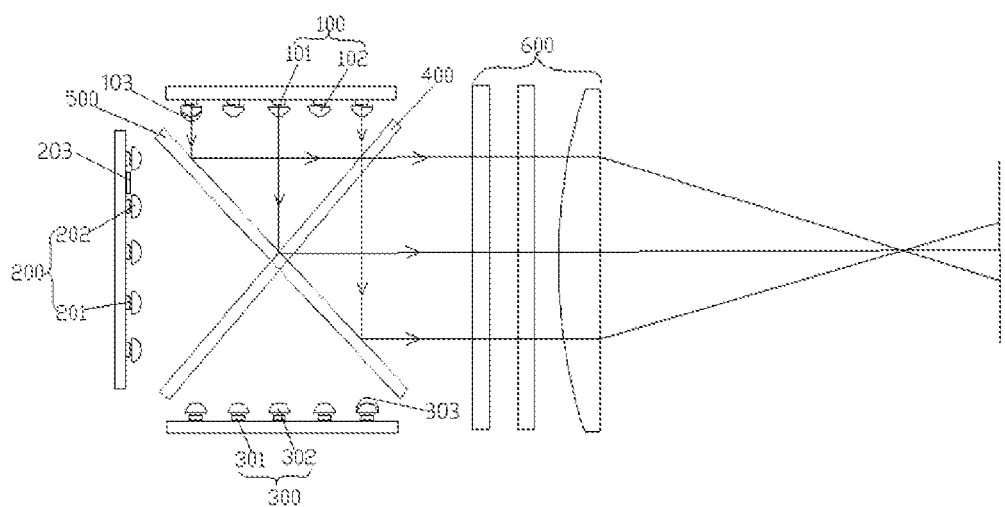
FIG. 1 is a schematic view of an optical path of a first light source module of a light source device according to the teachings of the present disclosure.
Figure 2:
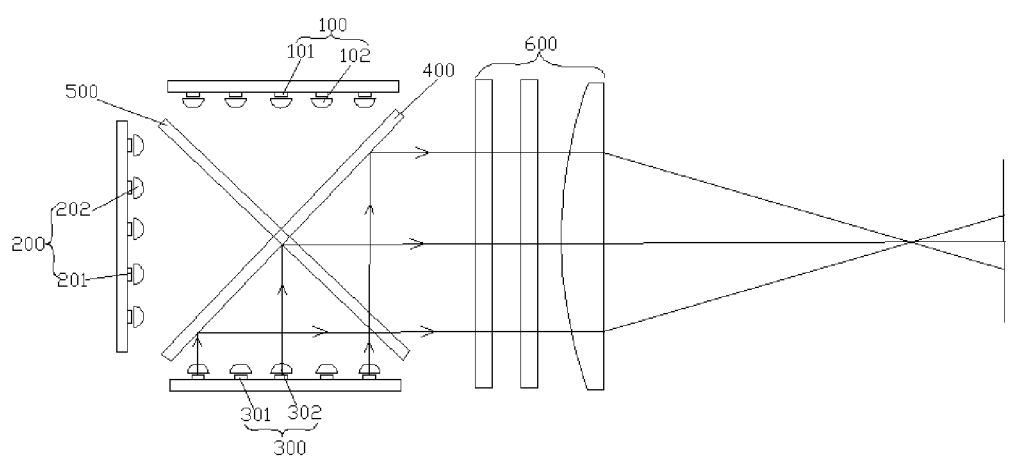
FIG. 2 is a schematic view of an optical path of a second light source module of a light source device according to the teachings of the present disclosure.
Figure 3:
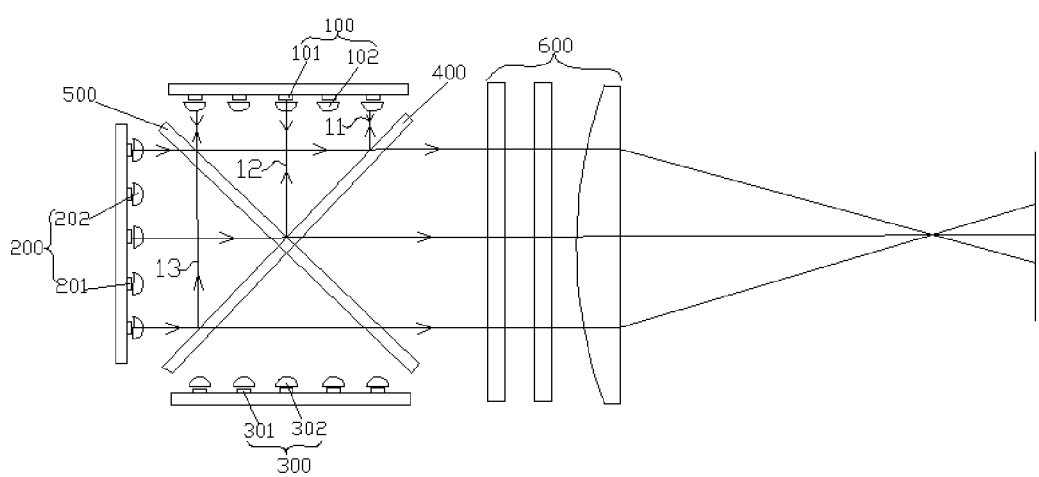
FIG. 3 is a schematic view of an optical path of a third light source module of a light source device according to the teachings of the present disclosure.

Referring to FIGS. 1 to 3, a structural composition of a light source device of the present disclosure is illustrated. In one form of the present disclosure, the light source device includes a first light source module 100, a second light source module 200, a third light source module 300, a first filter 400, a second filter 500, and a condensing lens group 600. In order to clearly illustrating running of light paths of light emitted by the respective light source modules, running of the light paths of the first light source module 100, the second light source module 200, and the third light source module 300 are shown in the schematic views of FIGS. 1-3, respectively.

The second light source module 200 faces a light exit of the light source device, and the first light source module 100 and the third light source module 300 are oppositely disposed on two sides of the second light source module 200. The first filter 400 and the second filter 500 are arranged to cross among the first light source module 100, the second light source module 200, and the third light source module 300.

The first light source module 100 emits first light having a wavelength in a first spectral range. For example, some variations of the present disclosure, the light in the first spectral range is red light. In such variations, the first light source module 100 can include a plurality of red LED light sources 101 and first lenses 102 corresponding to the red LED light sources 101. Accordingly, it should be understood that the first light is red light, and the first lenses 102 are used to collimate the red light.

The second light source module 200 emits polychromatic light, and the polychromatic light includes fifth light having a wavelength in the first spectral range, second light having a wavelength in a second spectral range, and third light having a wavelength in a third spectral range. The light in the second spectral range is blue light, and the light in the third spectral range is green light. In at least one variation of the present disclosure, the second light source module 200 includes a plurality of blue LED light sources 201 and a wavelength conversion device (not shown), and the blue LED light source 201 is irradiated on the wavelength conversion device to excite polychromatic green light having a certain spectral range. Specifically, the spectral range of the polychromatic light is between 400-700 nm, and it mainly includes green light having a wavelength range of 500-560 nm, i.e., the third light, and a small amount of blue light and red light, i.e., the second light and the fifth light. The second light source module 200 further includes a plurality of second lenses 202 corresponding to the blue LED light sources 201 in order to collimate the light emitted from the blue LED light sources 201.

The third light source module 300 emits fourth light having a wavelength in the second spectral range, and the third light source module 300 includes a plurality of blue LED light sources 301 and third lenses 302 corresponding to the blue LED light sources 301. The fourth light is blue light, and the third lenses 302 are used to collimate the fourth light.

The first filter 400 is a blue light filter, and it reflects blue light and transmits red light and green light. The second filter 500 is a red light filter, and it reflects red light and transmits blue light and green light.

As shown in FIG. 1, the condensing lens group 600 is disposed between the second light source module 200 and the light exit of the light source device and faces the second light source module 200. After the red light emitted by the first light source module 100 is reflected by the second filter 500, it then passes through the condensing lens group 600 to exit from the light exit of the light source device. As shown in FIG. 2, after the blue light emitted by the third light source module 300 is reflected by the first filter 400, it then passes through the condensing lens group 600 to exit from the light exit of the light source device.

Referring to FIG. 3, the second light source module 200 uses a blue light chip to enhance brightness, and after the emitted polychromatic light passes through the first filter 400 and the second filter 500, the blue light part and the red light part are cut off to obtain the green light, and then the green light passes through the condensing lens group 600 to exit from the light exit of the light source device. That is, when the polychromatic light is passing through the first filter 400, the blue light part will be reflected, and when passing through the second filter 500, the red light part will be reflected. The reflected red light will be reflected onto the blue LED light source 301, and the reflected blue light will be reflected onto the red LED light source 101. In a case where the first light source module 100 and the third light source module 300 are not respectively provided with isolation devices in the related art, the reflected red light causes the blue LED light source 301 to be attenuated, and the reflected blue light causes the red LED light source 101 to be attenuated. Since blue light has a short wavelength and high energy, the blue light being irradiated on the red LED light source 101 will cause the red light to be attenuated more seriously. Therefore, in FIG. 3, it is illustrated by taking the light path of the blue light reflected by the first filter 400 as an example while simplifying the light path of the red light reflected by the second filter 500.

The present disclosure provides a first isolation device 103 in the first light source module 100, and specifically, a blue light reflection film (not shown) may be deposited on the first lenses 102. As shown in FIG. 3, blue light 11, blue light 12, and blue light 13 obtained by reflection when the polychromatic light passes through the first filter 400 are irradiated on the red LED light sources 101, and since the first lenses 102 are deposited with the blue light reflection film, this part of blue light 11, 12, and 13 is reflected out again, which reduces or avoids light attenuation of the red light caused by the reflected blue light.

Similarly, the present disclosure provides a red light reflection device (not shown) in the third light source module 300, and specifically, a red light reflection film i.e., a second isolation device 303) may be deposited on the third lenses 302. The red light obtained by reflection when the polychromatic light passes through the second filter 500 is irradiated on the blue LED light source 301, and is reflected out again by the red light reflection film, which reduces or avoids light attenuation of the blue light caused by the reflected red light.

In at least one variation, the second light source module 200 is further provided with a light-absorbing material 203 that absorbs the blue light and the red light that are reflected back, and the light-absorbing material may be disposed between the plurality of blue LED light sources 201 of the second light source module 200. However, part of the returned blue light will be irradiated on the blue LED light source 201, and since a wavelength of the returned blue light is longer than a wavelength of the exciting blue light of the blue LED light source 201, the blue light returned to the blue LED light source 201 will excite the wavelength conversion device again to generate part of green light, while the remaining returned blue light is absorbed by the light-absorbing material.

Although the terms first, second, third, etc. may be used to describe various elements, components, regions, layers and/or sections, these elements, components, regions, layers and/or sections, should not be limited by these terms. These terms may be only used to distinguish one element, component, region, layer and/or section, from another element, component, region, layer and/or section. Terms such as "first," "second," and other numerical terms when used herein do not imply a sequence or order unless clearly indicated by the context. Thus, a first element, component, region, layer or section, could be termed a second element, component, region, layer or section without departing from the teachings of the example forms. Furthermore, an element, component, region, layer or section may be termed a "second" element, component, region, layer or section, without the need for an element, component, region, layer or section termed a "first" element, component, region, layer or section.

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The above are merely forms and variations of the present disclosure and the patent scope of the present disclosure is not limited thereto. Any equivalent structure or equivalent process transformation made by using the description and drawings of the present disclosure, or those directly or indirectly used in other related technical fields are included in the patent protection scope of the present disclosure.

What is claimed is:

1. A light source device, comprising:
   a first light source module configured to emit first light having a wavelength in a first spectral range;
   a second light source module configured to emit polychromatic light, the polychromatic light comprising second light having a wavelength in a second spectral range and third light having a wavelength in a third spectral range;
   a third light source module configured to emit fourth light having a wavelength in the second spectral range;
   a first filter configured to transmit the first light and the third light, reflect the second light, and reflect the fourth light to a light exit of the light source device to be outputted; and
   a second filter configured to transmit the third light and the fourth light, and reflect the first light to the light exit of the light source device to be outputted,
   wherein the first light source module is provided with a first isolation device, and the first isolation device is configured to prevent the second light from entering the first light source module.

2. The light source device according to claim 1, wherein the polychromatic light further comprises fifth light having a wavelength in the first spectral range, the second filter is further configured to reflect the fifth light in the polychromatic light to the third light source module, the third light source module is provided with a second isolation device, and the second isolation device is configured to prevent the fifth light from entering the third light source module.

3. The light source device according to claim 2, wherein the second light source module comprises a plurality of blue LED light sources, the second light source module is further provided with a light-absorbing material which absorbs the second light and/or the fifth light, and the light-absorbing material is disposed between the plurality of blue LED light sources.

4. The light source device according to claim 1, wherein the first light source module comprises a plurality of red LED light sources, the third light source module comprises a plurality of blue LED light sources, the second light source module comprises a plurality of blue LED light sources and a wavelength conversion device, light in the first spectral range is red light, light in the second spectral range is blue light, light in the third spectral range is green light, the first filter is a blue light filter, and the second filter is a red light filter.

5. The light source device according to claim 2, wherein the first isolation device is a device which is configured to reflect the second light, and the second isolation device is a device which is configured to reflect the fifth light.

6. The light source device according to claim 4, wherein the first light source module further comprises a plurality of first lenses corresponding to the plurality of red LED light sources.

7. The light source device according to claim 1, wherein the second light source module faces the light exit of the light source device, and the first light source module and the third light source module are oppositely disposed on two sides of the second light source module.

8. The light source device according to claim 7, wherein the first filter and the second filter are arranged to cross among the first light source module, the second light source module, and the third light source module.

9. The light source device according to claim 7, wherein the light source device further comprises a condensing lens group, and the condensing lens group is disposed between the second light source module and the light exit of the light source device and faces the second light source module.

10. A stage lamp illumination system, comprising a light source device, wherein the light source device comprises:
a first light source module configured to emit first light having a wavelength in a first spectral range;
a second light source module configured to emit polychromatic light, the polychromatic light comprising second light having a wavelength in a second spectral range and third light having a wavelength in a third spectral range;
a third light source module configured to emit fourth light having a wavelength in the second spectral range;
a first filter configured to transmit the first light and the third light, reflect the second light, and reflect the fourth light to a light exit of the light source device to be outputted; and
a second filter configured to transmit the third light and the fourth light, and reflect the first light to the light exit of the light source device to be outputted,
wherein the first light source module is provided with a first isolation device, and the first isolation device is configured to prevent the second light from entering the first light source module.

11. The light source device according to claim 6, wherein the first isolation device is a blue light reflective material provided on the plurality of first lenses.

12. The light source device according to claim 5, wherein the third light source module further comprises a plurality of third lenses corresponding to the plurality of blue LED light sources.

13. The light source device according to claim 12, wherein the second isolation device is a red light reflective material provided on the plurality of third lenses.

14. The stage lamp illumination system according to claim 10, wherein the polychromatic light further comprises fifth light having a wavelength in the first spectral range, the second filter is further configured to reflect the fifth light in the polychromatic light to the third light source module, the third light source module is provided with a second isolation device, and the second isolation device is configured to prevent the fifth light from entering the third light source module.

15. The stage lamp illumination system according to claim 14, wherein the second light source module comprises a plurality of blue LED light sources, the second light source module is further provided with a light-absorbing material which absorbs the second light and/or the fifth light, and the light-absorbing material is disposed between the plurality of blue LED light sources.

16. The stage lamp illumination system according to claim 10, wherein the first light source module comprises a plurality of red LED light sources, the third light source module comprises a plurality of blue LED light sources, the second light source module comprises a plurality of blue LED light sources and a wavelength conversion device, light in the first spectral range is red light, light in the second spectral range is blue light, light in the third spectral range is green light, the first filter is a blue light filter, and the second filter is a red light filter.

17. The stage lamp illumination system according to claim 14, wherein the first isolation device is a device which is configured to reflect the second light, and the second isolation device is a device which is configured to reflect the fifth light.

18. The stage lamp illumination system according to claim 16, wherein the first light source module further comprises a plurality of first lenses corresponding to the plurality of red LED light sources.

19. The stage lamp illumination system according to claim 18, wherein the first isolation device is a blue light reflective material provided on the plurality of first lenses.

20. The stage lamp illumination system according to claim 16, wherein the third light source module further comprises a plurality of third lenses corresponding to the plurality of blue LED light sources.

* * * * *